United States Patent [19]

Nakamura et al.

[11] Patent Number: 4,978,850
[45] Date of Patent: Dec. 18, 1990

[54] OPTICAL SENSOR SYSTEM

[75] Inventors: Akihisa Nakamura; Hideo Okamoto, both of Saitama, Japan

[73] Assignee: Honda Giken Kogyo Kabushiki Kaisha, Tokyo, Japan

[21] Appl. No.: 353,974

[22] Filed: May 18, 1989

[30] Foreign Application Priority Data

May 18, 1988 [JP] Japan ................. 63-121455

[51] Int. Cl.⁵ ................................. H01J 5/16
[52] U.S. Cl. .................. 250/227.11; 250/216
[58] Field of Search ............ 250/227, 216, 573, 577, 250/574, 227.11

[56] References Cited

U.S. PATENT DOCUMENTS

| 3,711,723 | 1/1973 | McMurtry | 250/227 |
| 4,377,086 | 3/1983 | Linder et al. | 250/227 |
| 4,425,788 | 1/1984 | Franke et al. | 250/227 |
| 4,500,204 | 2/1985 | Ogura et al. | 250/227 |
| 4,661,695 | 4/1987 | Mori et al. | 250/227 |
| 4,750,835 | 6/1988 | McMurtry | 250/227 |

FOREIGN PATENT DOCUMENTS 63-7305  1/1988  Japan .

*Primary Examiner*—David C. Nelms
*Assistant Examiner*—K. Shami
*Attorney, Agent, or Firm*—Lyon & Lyon

[57] ABSTRACT

An optical sensor system comprising a measuring head, a light source and a light detector which are connected to each other via flexible optical fiber cables. Since the measuring head may be made lightweight and vibration of the measuring head may be insulated from the light source and the light detector by the optical fiber cables, even when the object to be measured consists of a vibrating object, a high level of accuracy can be attained. In particular, if the measuring head comprises a coaxial light projector and light receiver, it can be designed as a highly compact structure which is highly resistant to vibrations. The measurement by the measuring head may be based on the use of the light receiver for the detection of fluorescent light produced from the object to be measured as a result of light radiation from the light projector.

3 Claims, 2 Drawing Sheets

OPTICAL SENSOR SYSTEM

TECHNICAL FIELD

The present invention relates to an optical sensor system for projecting light from a light source upon an object to be measured, receiving light emitted from the object to be measured, and converting the received light to an electric signal, and in particular to such an optical sensor system which is suitable for use on vibrating objects for measurement of thicknesses or gap widths.

BACKGROUND OF THE INVENTION

Conventionally, there have been known a number of optical sensor systems for measuring the surface contours and displacements of objects to be measured, and an example of such a system is disclosed in Japanese utility model publication No. 63-7305. Most of such optical sensor systems are based on trigonometric relationships of light beams, and the measuring heads of these systems typically comprise a light projector, a light receiver and a lens system enclosed in a casing of a complicated shape. Therefore, when such a measuring head is mounted on a vibrating object to be measured such as an internal combustion engine, the accuracy of the measurement may be impaired by the vibratory deformation of the measuring head.

Furthermore according to such a sensor system, since the positional relationships of the light projecting system and the light receiving system in relation with the object to be measured are fixed, and the relatively bulky laser generator and photoelectric converters forming such systems have a limited freedom of layout, the overall system tends to be large. For instance, when the thickness of an oil film between the inner wall surface of a cylinder and an outer wall surface of a piston in an internal combustion engine is to be measured during its operation, because of the vibration of the engine, even though it is difficult to solidly attach such a large sensor system to the engine, in reality, a considerable part of the system is required to be mounted directly upon the engine. Therefore, for this reason also, it has been difficult to achieve a high level of accuracy due to the deformation of the measuring system itself.

As an additional consideration, when a plurality of points are to be measured at the same time, one can provide light projecting systems and light receiving systems by the same number as the points to be measured, and can supply laser light from the same number of laser generators to the light projecting systems. However, it creates various problems because not only the size of the overall system increases but also the cost tends to be unacceptably high primarily due to the high cost of the laser generators. It is therefore advantageous to distribute laser light from a common laser generator to each of a plurality of light projecting means, but it is difficult to evenly distribute light to each light projecting means using mirrors and lenses, and the system for distributing light tends to increase the complexity and the size of the overall sensor system.

In order to reduce the influences of the deformation of the measuring system upon the accuracy of dimensional measurement on a vibrating object, it is preferable to use a measuring head having a light projector and a light receiver in a coaxial relationship. This is possible when measuring a gap width by filling the gap with a fluid containing a fluorescent substance which produces fluorescent light when laser light is radiated from the light projector upon it, and measuring the amplitude of the produced fluorescent light with the light receiver.

BRIEF SUMMARY OF THE INVENTION

In view of such problems of the prior art, a primary object of the present invention is to provide an economical optical sensor system which is suitable for compact design and can be used on vibrating objects to be measured.

A second object of the present invention is to provide a optical sensor system which can achieve a high level of accuracy even when it is used on vibrating objects.

A third object of the present invention is to provide a optical sensor system which permits dimensional measurements at a plurality of points at the same time.

These and other objects of the present invention can be accomplished by providing a optical sensor system, comprising; a light source; light projecting means for projecting light upon an object to be measured; first light guide means comprising a flexible optical fiber cable for conducting light from the light source to the light projecting means; light receiving means for receiving light emitted from the object to be measured as a result of projection of the light from the light projecting means; photoelectric conversion means for converting the light received by the light receiving means into an electric signal representing a measurement result; and second light guide means comprising a flexible optical fiber cable for conducting light from the light receiving means to the photoelectric conversion means.

By connecting flexible optical fiber cables between the light source and the light projecting means and between the light receiving means and the light detecting means, they can be arranged as desired, and since only the relatively light-weight light projecting means and light receiving means are required to be attached to a vibrating object to be measured, a measurement can be performed without interference by the movement of the object to be measured.

If the light projecting means and the light receiving means consist of end surfaces of the corresponding optical fiber cables arranged on a common surface of a measuring head facing the object to be measured, in a coaxial relationship, the measuring head may be made compact and a high level of optical efficiency may be attained. Furthermore, according to this arrangement, at least a part of the lens system interposed between the object to be measured and the measuring head can be used for both the light beams directed toward and from the object to be measured, the lens system may be simplified. According to a particularly advantageous embodiment, the lens system comprises a lens defining a central optical passage and an annular optical passage surrounding the central optical passage having two different optical properties, one for a light beam directed toward the object while the other is for another light beam directed away from the object.

Such a measuring head can be used to measure a gap width by filling the gap with a fluid containing a fluorescent substance which produces fluorescent light when laser light is radiated from the light projector upon it, and measuring the amplitude of the produced fluorescent light with the light receiver.

This optical sensor system can be advantageously used to measure a plurality of points at the same time. In such an embodiment, it is advantageous to use light distributing means which comprises a light receiving surface opposing the light source substantially perpendicularly to a light beam produced from the light source, and an end surface of each of the first optical fiber cables is arranged on a common circle around the axial center line of the light beam from the light source. It thereby becomes possible to evenly distribute the light from a single light source to a plurality of light projecting means without increasing the overall size of the optical sensor system.

BRIEF DESCRIPTION OF THE DRAWINGS

Now the present invention is described in the following with reference to the appended drawings, in which.

DESCRIPTION OF THE PREFERRED EMBODIMENT

Figures 1, 2:
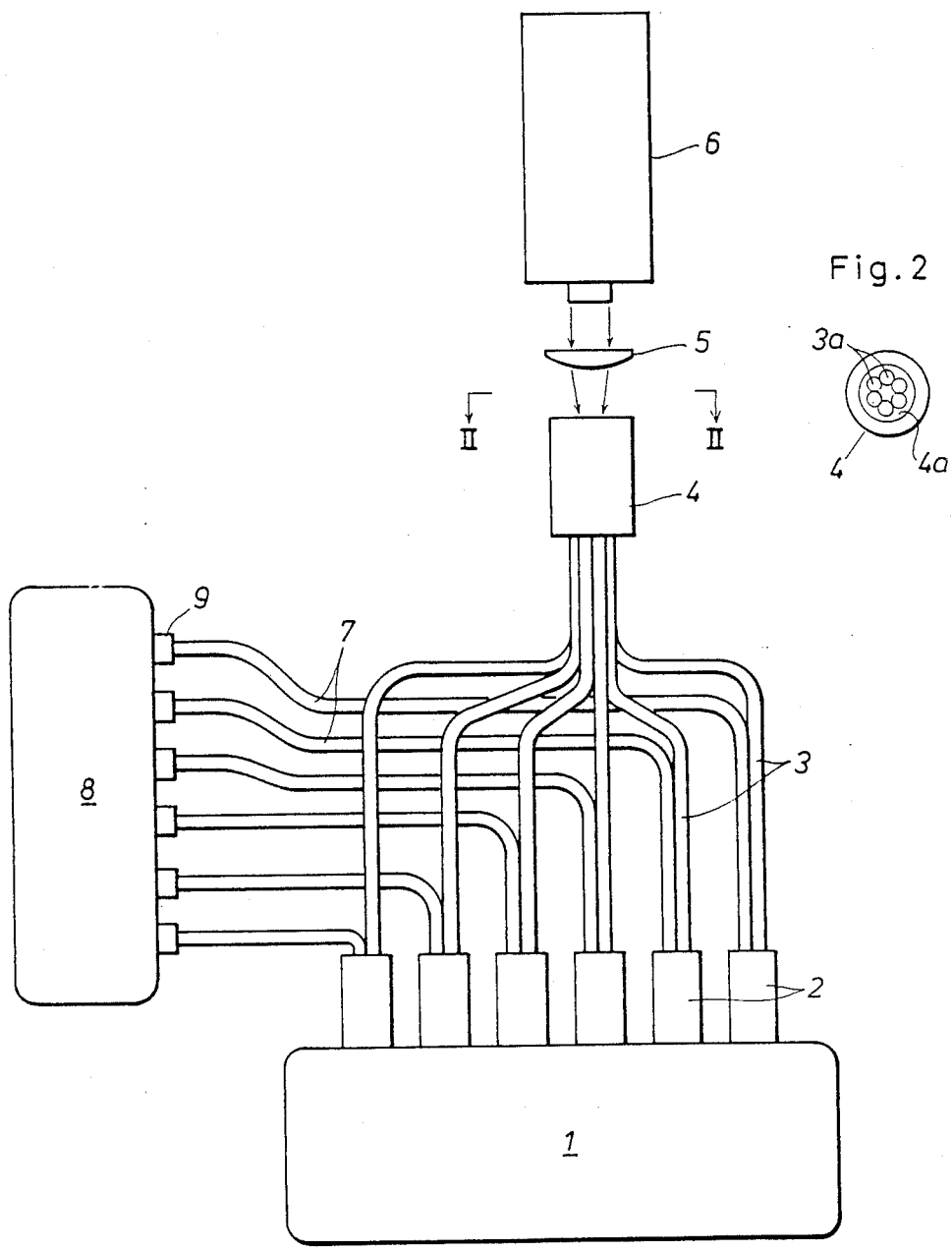
FIG. 1 is a schematic structural view of an optical sensor system according to the present invention.
FIG. 2 is a sectional view taken along line II—II of FIG. 1.

FIG. 1 schematically shows the structure of an optical sensor system according to the present invention for measuring the thickness of an oil film between the inner wall surface of a cylinder and a piston of an engine. A plurality of measuring heads 2 fixedly secured to the engine 1 for projecting light upon and receiving light from the oil are connected to a light distribution connector 4 via optical fiber cables 3 for light projection. The light distribution connector 4 receives a supply of laser light from a laser light generator 6 via a lens 5. Each of the measuring heads 2 is also connected to an input end 9 of one of a plurality of photo detectors 8 by way of one of a plurality of optical fiber cables 7 for light reception. Here, as shown in FIG. 2, in the surface of the light distribution connector 4 opposite to the laser light generator 6 or an end surface 4a, the light receiving end surfaces 3a of the optical fiber cables 3 for light projection are arranged on a common circle, and its center corresponds to the central axial line of the light beam projected from the laser light generator 6.

Figure 3:
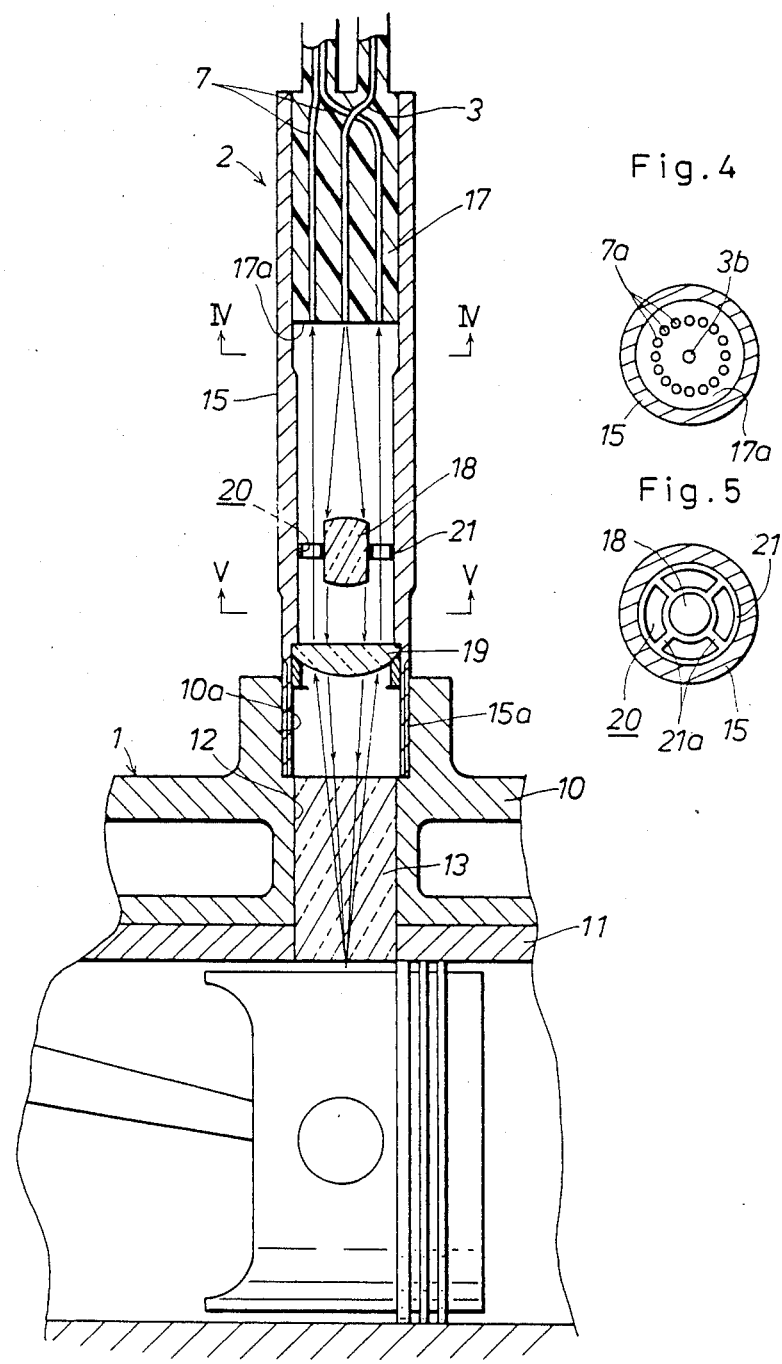
FIG. 3 is an enlarged longitudinal sectional view of one of the measuring heads of the optical sensor system according to the present invention.

FIG. 3 is an enlarged longitudinal sectional view of one of the measuring heads 2. An opening 12 is provided in the cylinder block 10 and the cylinder liner 11 of the engine 1 having an ordinary structure, for establishing a communication between the exterior and the interior of the engine 1. The internal end of the opening 12 or the lower part thereof in FIG. 2 is filled by a transparent member 13 which may be made of glass, and the measuring head 2 is coaxially fitted into the opening 12 from outside.

The measuring head 2 comprises a cylindrical holder 15, a optical fiber end retainer 17 provided in the base end of the holder 15 or the upper end thereof as seen in FIG. 3, and lenses 18 and 19 provided in an intermediate part of the holder 15. The measuring head 2 is fixedly secured to the engine by a male threaded portion 15a provided in the free end of the holder 15 for engagement with a female threaded portion 10a of the cylinder block 10.

Figure 4:
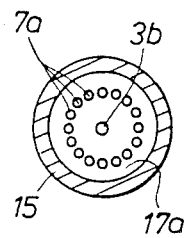
FIG. 4 is a sectional view taken along line IV—IV of FIG. 3.
Figure 5:
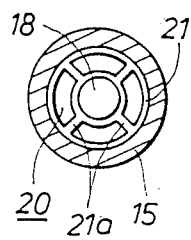
FIG. 5 is a sectional view taken along line V—V of FIG. 3.

In regards to the optical fiber end retainer 17, as shown in FIG. 4, the end surfaces (light receiving surfaces) 7a of the optical fiber cables 7 for light reception are arranged in an annular fashion around the end surface (light projecting surface) 3b of the optical fiber 3 for light projection in the end surface 17a thereof where the end surfaces 3b and 7a of the two sets of optical fiber cables 3 and 7 are exposed. The collimator lens 18 for light projection has its peripheral portion removed so as to define an annular passage 20 between the lens 18 and the inner circumferential wall surface of the holder 15, and is retained in the holder 15 by way of four arms 21a projecting from a lens holder 21 for this lens 18.

Now the operation of this embodiment is described in the following.

The light from the laser light generator 6 is projected upon the end surface 4a of the light distribution connector 4 via the lens 5, and, in this end surface 4a, is distributed to the optical fiber cables 3 for light projection connected to the measuring heads 2. Here, since the light receiving end surfaces 3a of the optical fiber cables 3 are arranged on a common circle, and its center coincides with the central axial line of the laser light emitted from the laser light generator 6, the light is evenly distributed to the end surfaces 3a.

The distributed light reaches the measuring heads 2, and, as shown by the arrows in FIG. 3, after passing through the opening 12 from the end surface 3b of the optical fiber 3, is projected upon the oil film contain a fluorescent substance in the cylinder via the collimator lens 18 and the condenser lens 19. The fluorescent light produced by the excitation of the fluorescent substance reaches the end surfaces 7a of the filaments of the optical fiber cable 7 for light reception after passing through the lens 19 and the annular passage 20. The light then reaches the input end 9 of the corresponding photo detector 8 via one of the optical fiber cables 7, and is photoelectrically converted into an electric signal for permitting the measurement of the thickness of the oil film.

Since the measuring heads 2, the laser light generator 6 and the photo detectors 8 are connected by the flexible optical fiber cables 3 and 7, the vibration of the engine 1 is insulated by the optical fiber cables, and is prevented from being transmitted to the laser light generator 6 and the photo detectors 8. Additionally, since the lens 19 functions both as the collimater lens for light projection and the condenser lens for the light reception, the number of component parts is substantially reduced.

Thus, according to the present invention, since the connection between the light projecting means and the light reception means, and between the relatively large light source and the light detecting means is established by optical fiber cables, the sensor system may be freely arranged in relation with the object to be measured, and, therefore, the optical sensor system may be favorably applied to vibrating objects. In particular, if the light is distributed to each of the light projecting means by arranging the first ends of the optical fiber cables, which are connected to the light projecting means at their second ends, around the central axial line of the light beam from the light source on a common circle, it becomes possible to evenly distribute the light from a single light source to a plurality of light projecting means without increasing the size of the sensor system or its cost. Further, by arranging the light receiving surfaces of the light receiving means around the light projecting surface of the light projecting means, and sharing a common lens by the light receiving and projecting surfaces, the number of the necessary component parts can be reduced, and the size of the sensor system can be reduced.

What we claim is:

1. An optical sensor system, comprising:

a light source;

light projecting means carried by a sensor head for projecting an incident light beam upon an object to be measured;

a first flexible optical fiber cable for conducting a light beam from said light source to said light projecting means, said light projecting means substantially consisting of an adjoining and surfaces of said first flexible optical fiber cable;

light receiving means also carried by said sensor head for receiving a light beam reflected from said object to be measured as a result of projecting said incident light beam upon said object to be measured;

photoelectric conversion means for converting a light beam received by said light receiving means into a electric signal representing a measurement result;

a plurality of second flexible optical fiber cables for conducting said reflected light beam to said photoelectric conversion means, said light receiving means substantially consisting of end surfaces of said second optical fiber cables surrounding said end surface of said first optical fiber cable in a coplanar relationship; and a lens system interposed between said end surfaces of said first and second optical fiber cables and said object to be measured, and comprising a first lens through which both said incident light beam and said reflected light beam pass, and a second lens having a smaller diameter than said first lens and disposed in a coaxial relationship with said first lens so as to be in the path of said incident light beam and clear of the path of said reflected light beam.

2. An optical sensor system according to claim 1, wherein said object to be measured consists of a liquid film containing a fluorescent substance.

3. An optical sensor according to claim 2, wherein said sensor head is adapted to be mounted on an internal combustion engine, and said liquid film consists of a lubricating oil film so that a thickness of said film may be measured according to an intensity of light received by said photoelectric conversion means for a given intensity of said incident light beam.

* * * * *